(12) United States Patent
Kucmerowski et al.

(10) Patent No.: US 7,995,560 B2
(45) Date of Patent: Aug. 9, 2011

(54) TELECOMMUNICATIONS SYSTEM AND METHOD OF SESSION INITIATION PROTOCOL (SIP) BASED COMMUNICATIONS BETWEEN ENDPOINTS

(75) Inventors: Dennis L. Kucmerowski, Delray Beach, FL (US); Luiz Cesar Zaniolo, Boca Raton, FL (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1388 days.

(21) Appl. No.: 11/497,656

(22) Filed: Aug. 2, 2006

(65) Prior Publication Data

US 2008/0043720 A1 Feb. 21, 2008

(51) Int. Cl.
*H04L 12/66* (2006.01)
(52) U.S. Cl. .... 370/352; 370/356; 370/351; 379/200.01
(58) Field of Classification Search .......... 370/352–356, 370/316, 338; 379/202.01
See application file for complete search history.

(56) References Cited

U.S. PATENT DOCUMENTS

| | | | |
|---|---|---|---|
| 2005/0063318 A1* | 3/2005 | Xu et al. | 370/254 |
| 2006/0176805 A1* | 8/2006 | Peters | 370/228 |
| 2007/0064682 A1* | 3/2007 | Adams et al. | 370/352 |
| 2007/0243898 A1* | 10/2007 | Eyre et al. | 455/552.1 |
| 2007/0286098 A1* | 12/2007 | Combs et al. | 370/259 |
| 2007/0288600 A1* | 12/2007 | Arabi et al. | 709/219 |
| 2008/0037752 A1* | 2/2008 | Chatilov et al. | 379/202.01 |

* cited by examiner

*Primary Examiner* — Nathan Flynn
*Assistant Examiner* — Khaled Kassim (57) ABSTRACT

A communications system and method of managing communications with multiple appearance endpoints, e.g. Session Initiation Protocol (SIP) endpoints in the communications system. At least one SIP endpoint includes a keyset with multiple lines, at least a primary line and one or more secondary and/or phantom lines. A Back to Back User Agent (B2BUA) manages communications with the SIP endpoints and multiple (e.g., all) line appearances register in a single REGISTER message sent by the primary line to the B2BUA. The B2BUA sends NOTIFY messages for any incoming call and once the call is answered sends an INVITE message to the answering endpoint. The B2BUA includes a media negotiator that negotiates early media with the SIP endpoints upon an indication of a pending call, incoming or outgoing.

9 Claims, 6 Drawing Sheets

TELECOMMUNICATIONS SYSTEM AND METHOD OF SESSION INITIATION PROTOCOL (SIP) BASED COMMUNICATIONS BETWEEN ENDPOINTS

BACKGROUND OF THE INVENTION

1. Field of the Invention

The present invention is related to telecommunications systems and more particularly, to Session Initiation Protocol (SIP) based telecommunications networks.

2. Background Description

Commercial telecommunications platforms have allowed service providers to deliver Internet Protocol (IP) based telecommunications services. Typical such IP telecommunications services feature common channel telecommunications packet switching capabilities, such as Signaling System Number 7 (SS7) signaling capabilities. These capabilities allow for legacy feature support and, further, interconnection with Public Switched Telephone Networks (PSTN). Digital communications such as Voice over IP (VoIP), for example, normally use Session Initiation Protocol (SIP) for establishing and clearing of connections-between network stations at SIP endpoints.

In a typical such enterprise communications environment/network a keyset may have multiple line appearances at a SIP endpoint, e.g., up to 30 appearances. Each appearance is a communications resource in that network and is assigned a unique Uniform Resource Indicator (URI). Also, a single line with an assigned associated Directory Number (DN) may be shared by multiple (e.g., up to 40) keysets. That line is a line appearance on each keyset.

Under current SIP standards every line appearance is registered with the network. Each registration is continually maintained. Both the initial registration and maintaining registrations consumes time and resources. Since all primary, secondary and phantom lines on any SIP endpoint must register and all shared lines must register, each of these registrations consume SIP endpoint resources. This limits the number of line appearances that can be assigned to the network and to each SIP endpoint.

Typically a call is placed to each incoming call by providing an "INVITE" message to every line appearance associated with a respective dialed destination, i.e., Directory Number/associated line. The typical INVITE message establishes early media, which eliminates any speech clipping issues that might otherwise subsequently arise when the destination answers the pending incoming call. A typical INVITE message is relatively large and consumes additional SIP endpoint resources and processing. This use of resources also reduces the amount of traffic that the network can handle. Consequently, the processing and resource consumption from both registering all line appearances and, then, widely distributing each INVITE message limits the number of line appearances for any given network.

Thus, there is a need for minimizing the number of registered appearances on a SIP based communications network and, further for reducing the cumulative resources consumed by INVITE messages.

SUMMARY OF THE INVENTION

It is a purpose of the invention to increase the allowable number of SIP endpoint line appearances;

It is another purpose of the invention to reduce processing and resource requirements in SIP based networks;

It is yet another purpose of the invention to increase the allowable number of SIP endpoint line appearances, while maintaining call quality;

It is yet another purpose of the invention to avoid speech clipping in SIP based incoming calls;

It is yet another purpose of the invention to establish early media in SIP based networks;

It is yet another purpose of the invention to increase the allowable number of SIP endpoint line appearances, while establishing early media in SIP based networks to avoid speech clipping in SIP based calls.

The present invention relates to a communications system and method of managing communications with multiple appearance endpoints, e.g. Session Initiation Protocol (SIP) endpoints in the communications system. At least one SIP endpoint includes a keyset with multiple lines, at least a primary line and one or more secondary and/or phantom lines. A Back to Back User Agent (B2BUA) manages communications with the SIP endpoints and only primary appearances register with the B2BUA. The B2BUA sends NOTIFY messages for any incoming call and once the call is answered sends an INVITE message to the answering endpoint. The B2BUA includes a media negotiator that negotiates early media with the SIP endpoints upon an indication of a pending call, incoming or outgoing.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
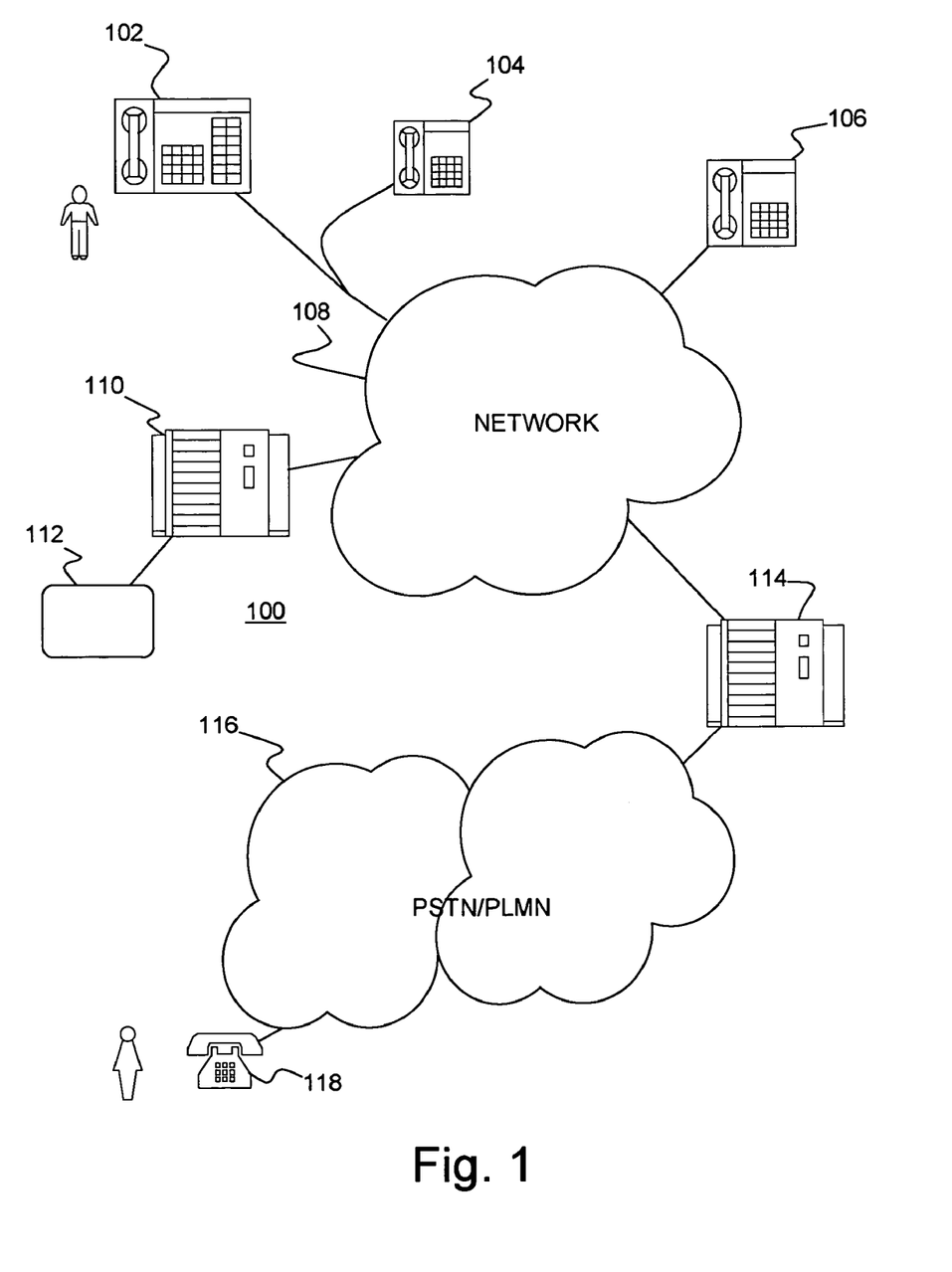
FIG. 1 shows an example of a preferred Session Initiation Protocol (SIP) based system including SIP endpoints some of which have multiple line capabilities with suitable audio communications devices, e.g., keysets.

Turning now to the drawings and more particularly, FIG. 1 shows an example of a preferred Session Initiation Protocol (SIP) based system 100. Some SIP endpoints have multiple line capabilities with suitable audio communications devices, e.g., keysets 102, 104, 106. The keysets 102, 104, 106 may be connected over the network 108 to a Back to Back User Agent (B2BUA) 110 that maintains a media negotiator 112. The network 108 also may include one or more appropriate SIP server(s) 114, for example, a presence server, a registrar server, a location server, a proxy server and/or a redirect server. The SIP server 114 in this example is a gateway server to a public switched telephone network/public land mobile network (PSTN/PLMN) 116 for external communications, e.g., at analog telephone 118.

The network 108 may be, for example, a Local Area Network (LAN), a wireless LAN (w-LAN or wi-fi), or the Internet. The keysets 102, 104, 106 may be, for example, digital telephones and/or, soft phones, that are connected for voice communications and some of which have multiple line appearances, e.g., a primary line, secondary lines and phantom lines. The preferred B2BUA 110 distributes calls by sending messages notifying of an incoming call to all corresponding lines of a called number including the primary line secondary lines and phantom lines. Correspondingly, for each call, each SIP endpoint (keysets 102, 104, 106) and server (e.g., gateway server 114) on the network 108 is responsible for establishing media and sending, accepting, and interpreting a Call Type and an Originating Network ID included in each notification message. So, for example, keyset 102 may have G.711 and G.729 media capability, a primary line with a direct number (DN) of 3700 and an IP address at host.3700.3700; keyset 106 may have G.711 media capability, a primary line with a direct number (DN) of 3710 and an Internet Protocol (IP) address at host.3710.3710; and, each direct number has a secondary appearance on the other keyset, i.e., keyset 102 has a secondary line of 3710 and keyset 106 has a secondary line of 3700. In this example, the gateway server 114 also may have G.711 media capability and be registered with the B2BUA 110, e.g., at host.GW.00001. The PSTN/PLMN 116 may include, for example, any suitable land based telephone network with analog telephone 118 of 561-555-1111 and/or a suitable wireless network. The media negotiator 112 is a service that negotiates media for each call to the keysets 102, 104, 106.

During each incoming call, the B2BUA 110, which contains a list of all endpoints with line appearances, issues a NOTIFY message to all line appearances of the called number, including secondary and phantom appearances. The media negotiator 112 alerts all primary lines and associated secondary and phantom lines and, further, negotiates media with the calling party/gateway 114. Only after one endpoint answers the call does the B2BUA issue an INVITE message to the answering endpoint. For outgoing calls, the originating endpoint generates an INVITE message based on its current primary appearance registration. The endpoint populates the "From" header of the INVITE message with the current primary appearance information. When the B2BUA 110 receives such an INVITE message, the B2BUA 110 reads from the "From" header and processes the message according to the originating line, regardless of whether the call is initiated from the primary line or a secondary or phantom appearance.

Figure 2A:
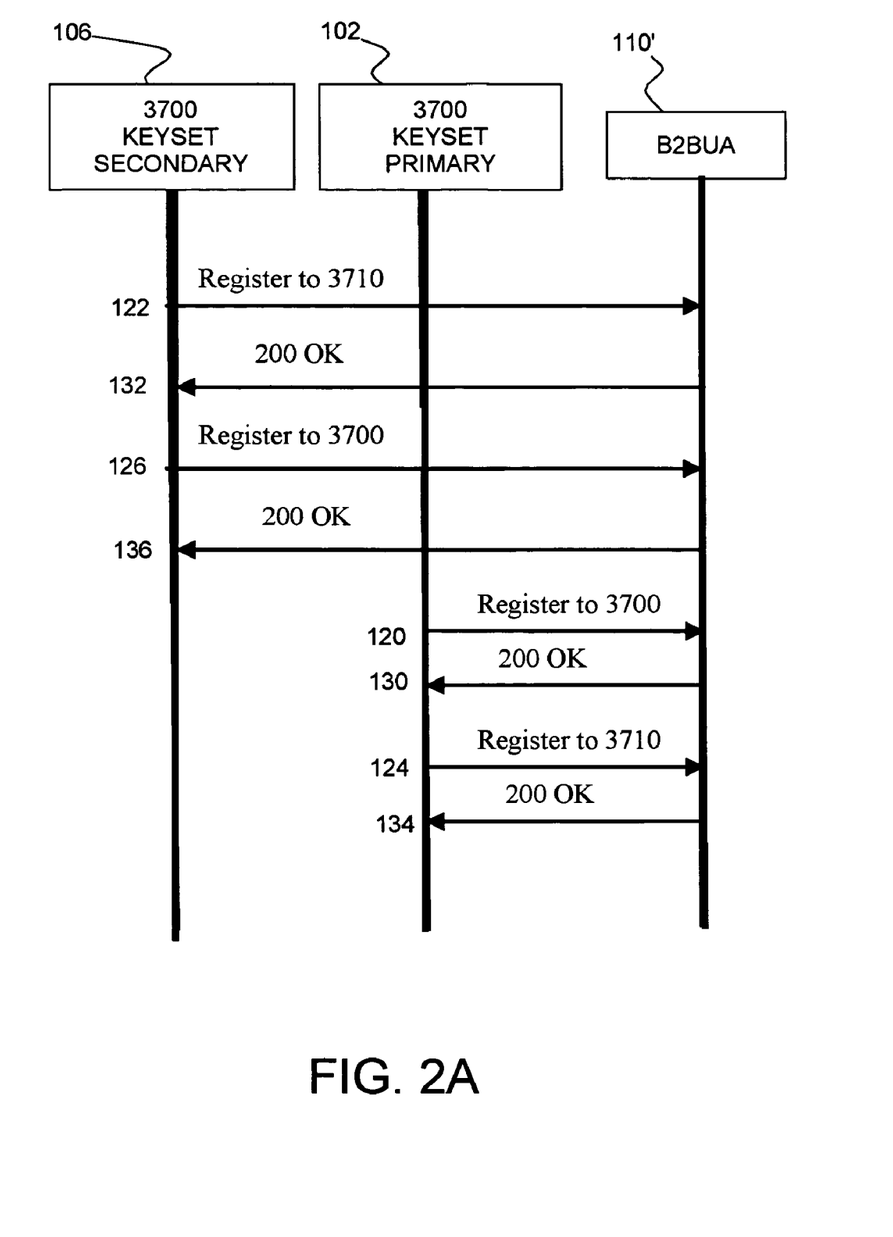
FIGS. 2A-B shows an example of SIP communications within the constraints of current Internet Engineering Task Force (IETF) standards.
Figure 2B:
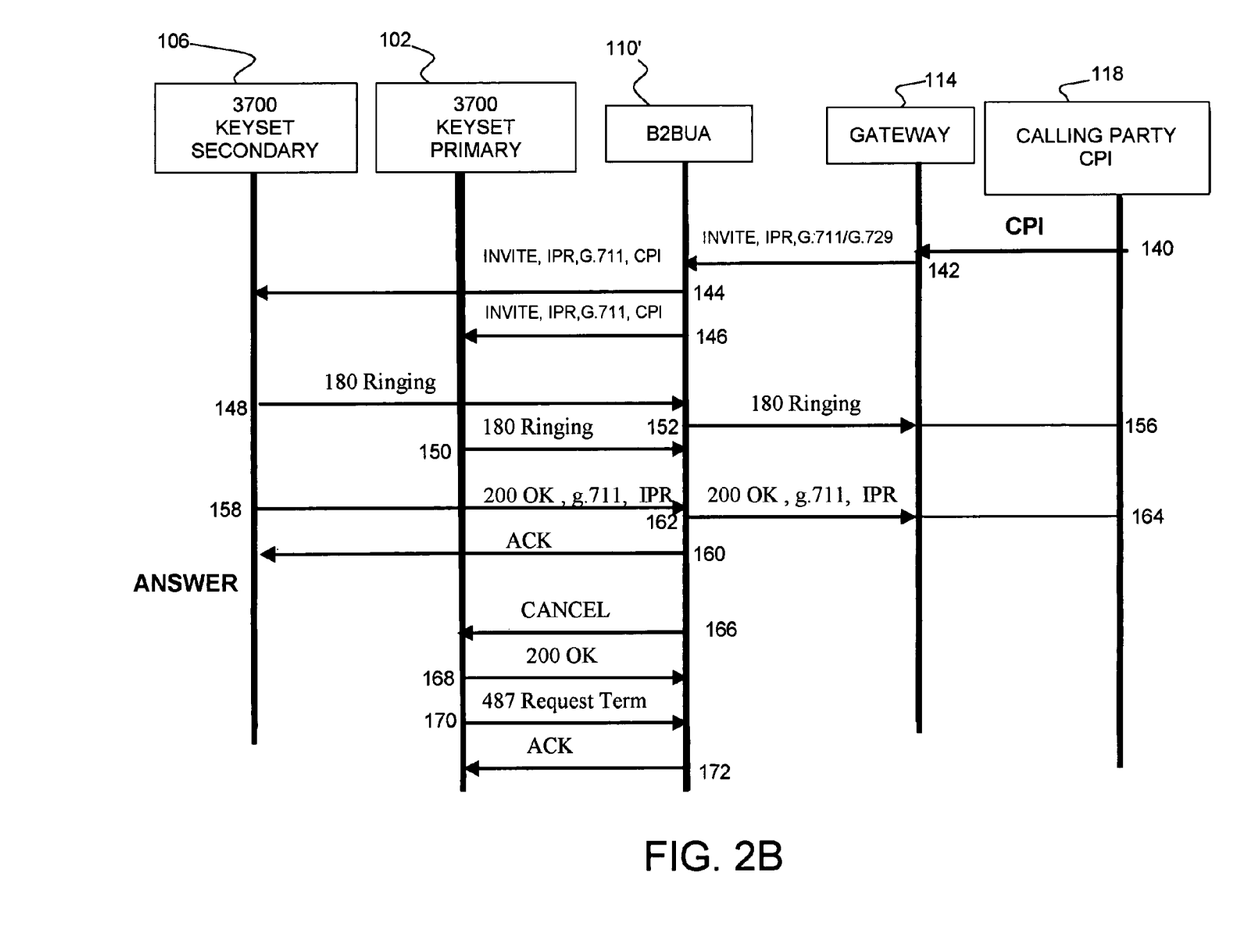

Thus, advantages of the present invention may be better appreciated by comparison of SIP communications operating within the constraints of current Internet Engineering Task Force (IETF) standards as shown in FIGS. 2A-B in a network, substantially similar to the network 100 of FIG. 1 with like elements labeled identically. FIG. 2A shows an example of registration of two of the keysets 102, 106 with the B2BUA 110' operating as a proxy server and without the media negotiator 112. FIG. 2B shows an example of an incoming call from the analog telephone 118 to the number of one of the keysets 102, 106 with the call being answered at a secondary line. A typical B2BUA 110' is a logical entity that receives a request and processes it as a user agent server (UAS), e.g., forwarding messages to endpoints or servers. Also, acting as a user agent client (UAC), the B2BUA 110' also receives requests, and determines how each request should be answered. Based on that determination, the B2BUA 110' generates and relays an appropriate request to the appropriate endpoint or server. Thus, a B2BUA 110' is a concatenation of a UAC and UAS.

So in FIG. 2A, for example, each keyset 102, 106 registers by sending a respective registration message 120, 122 with the IP address for its primary appearance (3700, 3710) to the B2BUA 110'. Substantially simultaneously, each keyset 102, 106 sends a registration message 124, 126 for its secondary appearance (3710, 3700) to the B2BUA 110'. Once registration is complete for each appearance, the B2BUA 110' responds to each of the 4 registration requests with a corresponding "200 OK" message 130, 132, 134 and 136. Registration order is not important for this example, so, this may be occur sequentially, interlaced or in parallel.

After registration, each keyset 102, 106 can place calls and, as shown for a call to DN 3700 in FIG. 2B, receive calls to both primary and secondary appearances. So, the gateway server 114 receives Call Party Information (CPI, 5615551111) at 140 originating from analog telephone 118. The gateway server 114 responds by sending an INVITE message 142 that includes the calling and called party numbers and calling IP Registry address (IPR, host.3700.3700) and media type (G.711) to the B2BUA 110'. The B2BUA 110' forwards the INVITE message 144, 146 to both the primary and secondary keyset 102, 106. Both keysets 102, 106 respond 148, 150 with a "180 ringing" response. The B2BUA 110' forwards the "180 ringing" response 152 to the gateway server 114, which passes a ringback 156 to the analog telephone 118. Ringing continues until one of the keysets, e.g., 106, goes off hook and returns a "200 OK" response 158 to the B2BUA 110' to establish media (G.711) for the secondary appearance IPR. Then, the B2BUA 110' both acknowledges the "200 OK" response to the originating keyset 106 with an "ACK" response 160 and, forwards the "200 OK" response 162 to the gateway server 114. The gateway server 114 establishes the voice connection 164 with the analog telephone 118. Also, once the B2BUA 110' receives the "200 OK" response 158, the B2BUA 110' sends a CANCEL message 166 to the other primary line keyset 102. Keyset 102 responds with a "200 OK" response 168 and sends a termination request (487 Request Term) 170 to initiate terminating the dialog. The B2BUA 110' acknowledges the termination request with an ACK response 172.

Figure 3A:
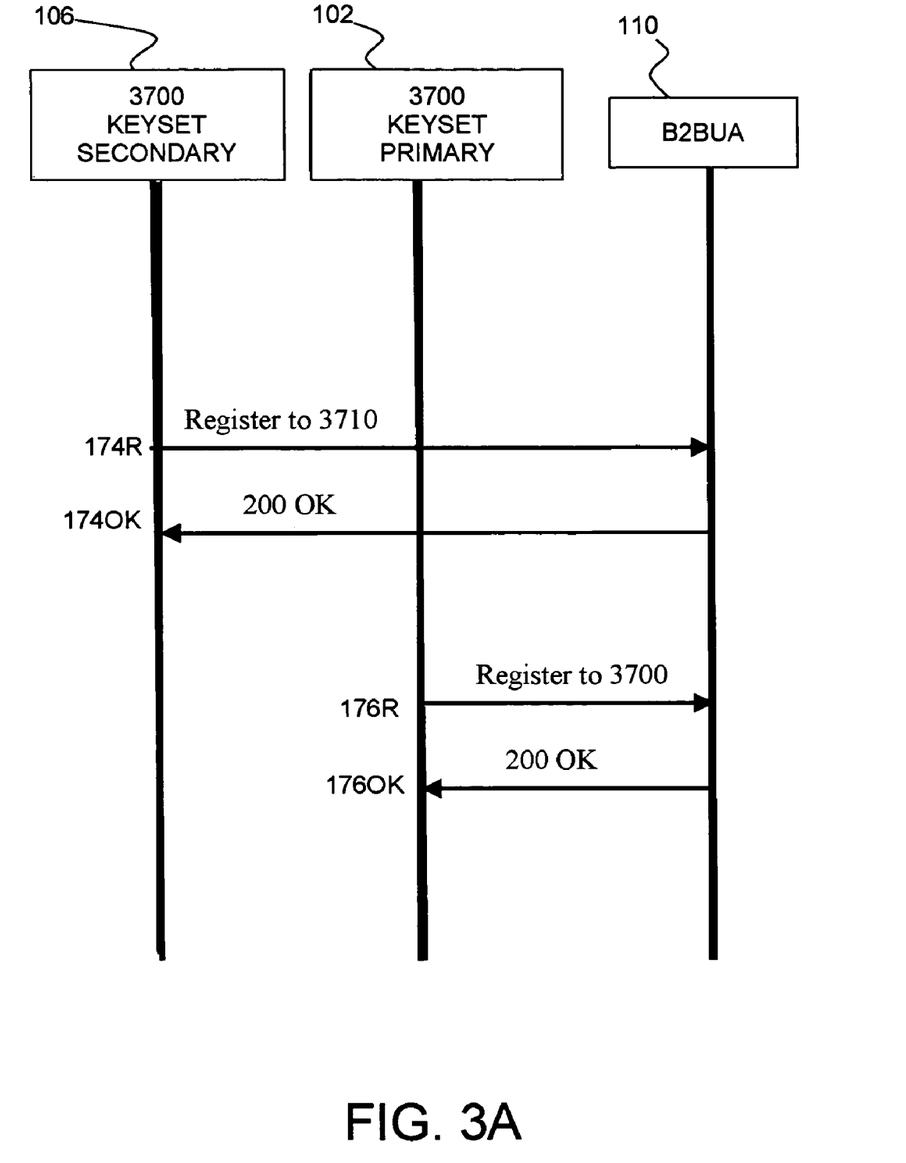
FIGS. 3A-B shows a call placed according to a preferred embodiment of the present invention, wherein secondary and phantom lines do not register and a single INVITE message is sent only to the answering keyset.
Figure 3B:
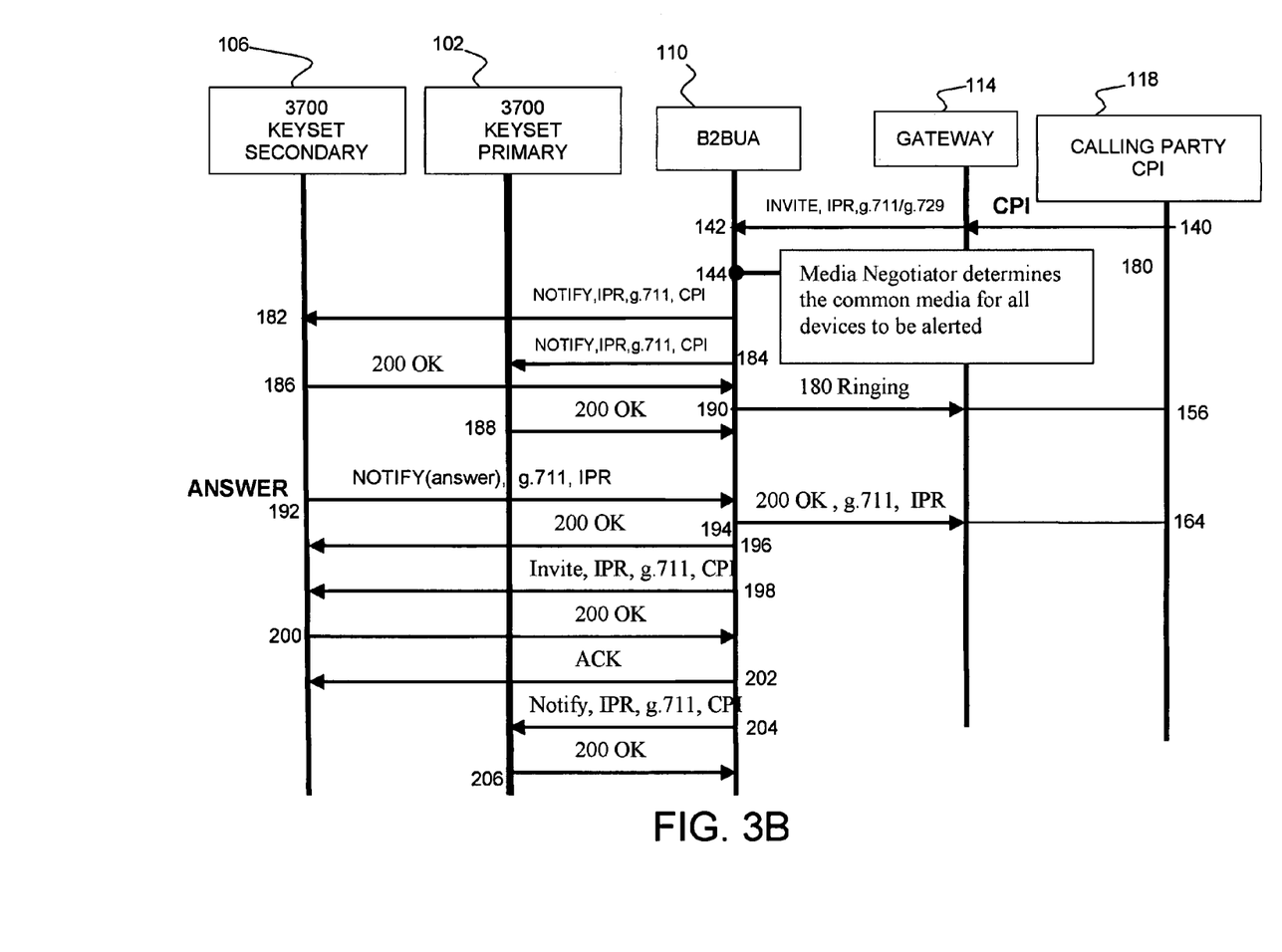

By contrast, the example of FIGS. 3A-B shows the same call placed with the network 100 of FIG. 1 acting according to a preferred embodiment of the present invention, wherein secondary and phantom lines do not register and a single INVITE message is sent only to the answering keyset 106. So, as shown in FIG. 3A, only primary appearances of every device 102, 106 register an IP address 174R, 176R with the B2BUA 110, while secondary lines and phantom lines are not required to and do not register. However, the registration message also includes the numbers of any secondary lines and phantom lines that are associated with a respective registering device 102, 106. The registration information is passed to the media negotiator 112 and the B2BUA 110 responds to each with a "200 OK" response 174OK, 176OK. Thus, as is apparent from this example, only about half of the network resources are consumed in registration and maintaining registration as were consumed in the standard network example of FIG. 2A. After registering primary lines, the B2BUA 110 handles calls to all keyset appearances with keysets 102, 104, 106, maintains a dialog state that indicates all connections to the keysets 102, 104, 106 and participates in all requests sent on the dialogs. The media negotiator service 112 negotiates media for each call to the keysets 102, 104, 106. However, since the B2BUA 110 registers only primary lines, and since secondary and phantom lines are not required to register, the number of primary lines that can have a presence is limited only by the number of appearances that the B2BUA 110 can register and so, for the same resources, the total number of allowable endpoints is increased.

Similarly after registration, all keysets 102, 104, 106 can receive calls at secondary and phantom lines according to a preferred embodiment of the present invention as shown in FIG. 3B for keysets 102 and 106. However, system resources used in a call are substantially reduced over standard calls similarly placed following the IETF standard, e.g., as shown in FIG. 2B. Calls to/from primary appearances are unchanged and so, not discussed. Again as in the standard network example of FIG. 2B, the gateway server 114 receives Calling Party Information (CPI, 5615551111) at 140 originating from analog telephone 118. Again, the gateway server 114 responds by sending an INVITE message 142 that includes calling party number plus the gateway host address and called party number plus the B2BUA host address and media type (G.711/G.729) to the preferred B2BUA 110. However, upon receipt of the INVITE message, the media negotiator 112 determines a common media (G.711) 180 for all devices that are to be alerted regarding the incoming call. The preferred B2BUA 110 forwards INVITE messages 182, 184 to each registered appearance. The INVITE messages 182, 184 carry the IPR, media and CPI for the incoming call to each registered keyset 102, 106. Each registered keyset 102, 106 responds with a "200 OK" response 186, 188. In response, the B2BUA 110 forwards a "180 ringing" response 190 to the gateway server 114, which passes a ringback 156 to the analog telephone 118. When one of the keysets, e.g., 106, goes off hook to answer, the off hook keyset 106 sends a NOTIFY (answer) message 192 carrying the IPR and establishing the media (G.711) to the B2BUA 110. The B2BUA 110 forwards a "200 OK" response 194 carrying the IPR and establishing the media (G.711) to the gateway server 114. The gateway server 114 establishes the voice connection 164 with the analog telephone 118. Next, the B2BUA 110 responds to the NOTIFY(answer) message with a "200 OK" response 196 and sends an INVITE message 198 that carries the IPR and CPI and establishes media with the answering keyset 106. The answering keyset 106 responds with a "200 OK" response 200. The B2BUA 110 acknowledges the termination request with an ACK response 202 and notifies other keysets, e.g., 102, with a NOTIFY message 204 that carries the IPR and CPI and media to indicate that the incoming call has connected and the media established in the connection and a "200 OK" response 206 is returned. Thus, since a NOTIFY message occupies much less resources than an INVITE message, significant resources are saved in calls placed according to a preferred embodiment of the present invention.

Figure 4:
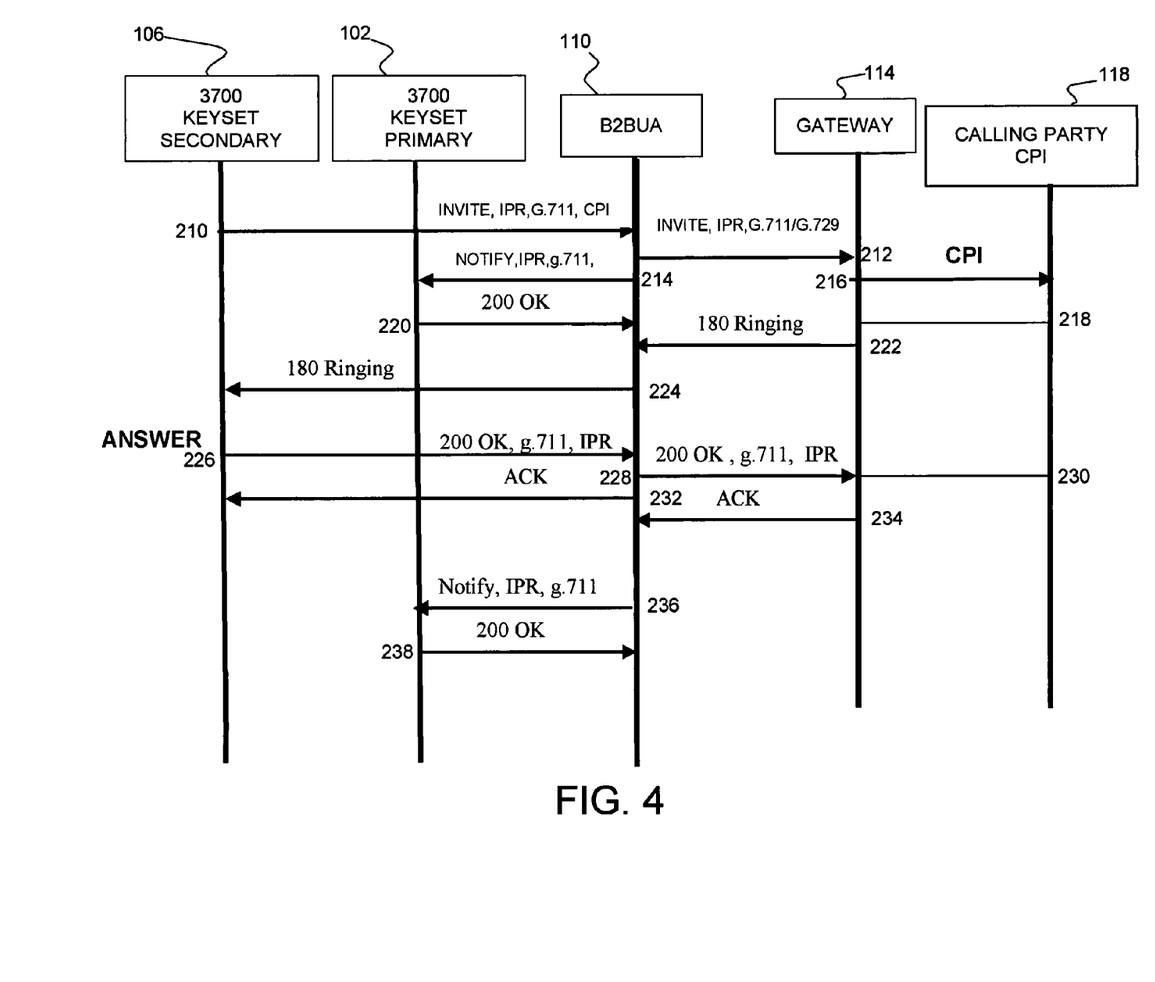
FIG. 4 shows an example of placing an outgoing call from a secondary line in a preferred embodiment network.

FIG. 4 shows an example of placing an outgoing call from a secondary line (e.g., 3700 of keyset 106) in a preferred embodiment network, e.g., from keyset 106 in network 100 of FIG. 1 to analog telephone 118. First, the originating keyset 106 sends an INVITE message 210 that includes an IP Registry address of the B2BUA, media type (G.711) and the calling party identification (CPI, xxx-xxx-3700) to the B2BUA 110. The B2BUA 110 responds by forwarding the INVITE message 212 to the gateway server 114 and, sending a NOTIFY message 214 to the primary keyset 102. The gateway server 114 forwards the CPI 216 to the dialed external number, e.g., at analog telephone 118, which begins to ring and responds with a ring indication 218. The primary keyset 102 responds to the NOTIFY message with a "200 OK" response 220 to the B2BUA 110. When the gateway server 114 receives the ring indication, the gateway server 114 returns a "180 ringing" response 222 to the B2BUA 110, which the B2BUA 110 forwards 224 to the originating keyset 106. The originating keyset 106 returns a "200 OK" response 226 carrying the IPR and establishing the media (G.711) to the B2BUA 110. The B2BUA 110 forwards a "200 OK" response 228 carrying the IPR and establishing the media (G.711) to the gateway server 114. The gateway server 114 provides to the called party 118 the channel 230. The B2BUA 110 acknowledges the "200 OK" response from the originating keyset 106 with an "ACK" response 232; and the gateway server 114 acknowledges the "200 OK" response 228 from the B2BUA 110 with an "ACK" response 234. The B2BUA 110 send another NOTIFY message 236 to the primary keyset 102, which responds with a "200 OK" response 238.

Advantageously, the present invention provides enhanced telecommunication features over existing SIP communications. The preferred B2BUA acts as a proxy server using a single REGISTER message to allow connected keysets with multiple line appearances (a primary line, secondary lines and phantom lines) to operate seamlessly with a single registration for the primary line rather than a registration for each line appearance. Registering other line appearances (secondary and phantom lines) is unnecessary because the REGISTER message for the prime line already contains information about the appearances. To place a call to a keyset subscriber, NOTIFY messages are provided to the appearances. Each NOTIFY message carries additional data necessary for media establishment, that when signaling a line appearance, includes IP address and calling party information. This additional data provides a mechanism for establishing early media for incoming calls that is previously unavailable in IETF standard protocol communications. The media negotiator in the B2BUA pre-negotiates media (e.g., G.177, G.729) between the calling party and all called keysets that have line appearances of the called direct number. So, advantageously, by establishing media early, speech clipping is avoided. With the media established the B2BUA sends an INVITE to an answering keyset and, sends NOTIFY messages to all other keysets with a shared appearance of the line. Further, outgoing calls use a primary appearance registration in INVITE messages that may originate from a corresponding secondary or phantom line.

Since only primary line appearances are registered but none of the secondary and phantom lines, available SIP endpoint resources are effectively increased over the more cumbersome requirement of registering and maintaining each appearance. Also, NOTIFY messages consume much less processing and resources than in typical state of the art SIP communications, i.e., those IETF standard protocol communications that rely heavily on "INVITE" messages. Further, the preferred B2BUA can use the primary line registration in INVITE messages from unregistered secondary and phantom lines, as well, to originate calls, which allows for supporting a greater number of line appearances with fewer resources. Also, preferred NOTIFY messages avoid distributing a much larger INVITE message for each incoming call and to every device with an appearance at the requested Directory Number or an associated line.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A communications system comprising:
    a plurality of Session Initiation Protocol (SIP) endpoints connected to a SIP network;
    at least one first keyset for a first SIP endpoint of the plurality of SIP endpoints, the at least one first keyset having multiple lines available for establishing connections to the first SIP endpoint, the multiple lines comprising a primary line and at least one secondary line;

a Back to Back User Agent (B2BUA) managing communications with the plurality of SIP endpoints;

a media negotiator connected to the B2BUA, the media negotiator negotiating media with the plurality of SIP endpoints responsive to an indication of a pending call;

wherein the at least one first keyset registers with the B2BUA such that only the primary line of the at least one first keyset registers with the B2BUA via a registration message, the registration message comprising address information for the at least one secondary line, the at least one secondary line not registering with the B2BUA;

wherein the B2BUA forwards the address information of the at least one secondary line to the media negotiator;

wherein the B2BUA manages calls to the at least one first keyset after the at least one first keyset registers with the B2BUA;

a gateway server connecting the B2BUA to a public switched telephone network or public land mobile network, the gateway server receiving an incoming call and responding by sending an invite message comprising calling party number information, address information for the gateway server, a called party number, and a media type to the B2BUA, the media negotiator determining a common media for all devices to be alerted regarding the incoming call, and the B2BUA forwarding the invite message to each registered primary line of the at least one first keyset; and wherein the at least one first keyset is comprised of a plurality of first keysets and wherein one of the first keysets responds to the invite message forwarded by the B2BUA via a notify message for receiving the incoming call and wherein the B2BUA sends a notify message to the other first keysets that the incoming call has been connected and wherein each of the notify messages uses less resources than the invite message.

2. The communications system of claim 1 further comprising at least one second keyset for a second SIP endpoint of the SIP endpoints, the at least one second keyset having multiple lines available for establishing connections to the second SIP endpoint.

3. The communications system of claim 1 wherein the B2BUA acts as a proxy server.

4. The communications system of claim 1 wherein the address information is comprised of a directory number.

5. The communications system of claim 1 wherein one of the at least one first keysets responds to the invite message forwarded by the B2BUA via a notify message for receiving the incoming call and wherein the B2BUA sends a notify message to any other of the at least one first keysets that the incoming call has been connected.

6. The communications system of claim 1 wherein one of the first keysets sending an invite message to the B2BUA for initiating a call to a telephone, the B2BUA, responding to the invite message by forwarding the invite message to the gateway server, the gateway server communicating with the telephone to initiate a connection between the telephone and the first keysets that sent the invite message to the B2BUA for initiating the call to the telephone.

7. A method of managing communications in a Session Initiation Protocol (SIP) communications system comprising:

for a plurality of a first keysets of SIP endpoints, registering a primary line for a each of the first keysets with a back to back user agent (B2BUA) via a registration message sent from each of the first keysets to the B2BUA, each of the registration messages comprising address information for at least one secondary line of the first keysets, the at least one secondary line of each of the first keysets not being registered with the B2BUA;

the B2BUA forwarding the address information of the at least one secondary line to a media negotiator;

the B2BUA managing calls to the first keysets after the first keysets register with the B2BUA;

a gateway server connecting the B2BUA to a public switched telephone network or public land mobile network;

the gateway server receiving an incoming call and responding by sending an invite message comprising calling party number information, address information for the gateway server, a called party number, and a media type to the B2BUA;

the media negotiator determining a common media for all devices to be alerted regarding the incoming call;

the B2BUA forwarding the invite message to the registered primary line of the first keysets;

one of the first keysets responding to the invite message forwarded by the B2BUA via a notify message for receiving an incoming call; and the B2BUA sending a notify message to the other first keysets that the incoming call has been connected, wherein each of the notify messages uses less resources than the invite message.

8. The method of claim 7 wherein management of calls to the first keysets performed by the B2BUA is comprised of:

the B2BUA forwarding an answering message from the keyset that responded to the forwarded invite message to the gateway server for forming the connection between that keyset and a device that initiated the incoming call.

9. The method of claim 7 further comprising:

one of the first keysets sending an invite message to the B2BUA for initiating a call to a telephone;

the B2BUA responding to the invite message for initiating the call to the telephone by forwarding the invite message to the gateway server; and the gateway server communicating with the telephone to initiate a connection between the telephone and the first keyset that sent the invite message to initiate the call to the telephone.

* * * * *